US012603869B2

(12) United States Patent
D'Ercoli

(10) Patent No.: US 12,603,869 B2
(45) Date of Patent: Apr. 14, 2026

(54) PRIVACY SOLUTION FOR IMAGES LOCALLY GENERATED AND STORED IN EDGE SERVERS

(71) Applicant: DATALOGIC IP TECH S.R.L., Calderara di Reno (IT)

(72) Inventor: Francesco D'Ercoli, Bologna (IT)

(73) Assignee: DATALOGIC IP TECH S.R.L., Calderara di Reno (IT)

( * ) Notice: Subject to any disclaimer, the term of this patent is extended or adjusted under 35 U.S.C. 154(b) by 48 days.

(21) Appl. No.: 18/401,161

(22) Filed: Dec. 29, 2023

(65) Prior Publication Data

US 2025/0220005 A1 Jul. 3, 2025

(51) Int. Cl.
| | |
|---|---|
| *H04L 29/06* | (2006.01) |
| *G06F 21/62* | (2013.01) |
| *H04L 9/06* | (2006.01) |
| *H04L 9/08* | (2006.01) |
| *H04L 9/32* | (2006.01) |
| *H04L 9/40* | (2022.01) |

(52) U.S. Cl.
CPC ...... *H04L 63/0435* (2013.01); *G06F 21/6209* (2013.01); *H04L 9/0643* (2013.01); *H04L 9/0822* (2013.01); *H04L 9/3247* (2013.01)

(58) Field of Classification Search
CPC . H04L 63/0435; H04L 9/0643; H04L 9/0822; H04L 9/3247; G06F 21/6209
See application file for complete search history.

(56) References Cited

U.S. PATENT DOCUMENTS

| | | | |
|---|---|---|---|
| 10,892,892 B1 * | 1/2021 | Mehta | H04L 9/3257 |
| 2008/0285756 A1 * | 11/2008 | Chuprov | H04L 63/062 |
| | | | 380/277 |
| 2016/0011990 A1 * | 1/2016 | Berengoltz | G06F 12/1433 |
| | | | 711/152 |
| 2018/0013562 A1 * | 1/2018 | Haider | H04L 9/0825 |
| 2019/0173668 A1 * | 6/2019 | Cui | H04L 9/083 |
| 2019/0349342 A1 | 11/2019 | D'Ercoli et al. | |
| 2022/0158829 A1 * | 5/2022 | Parkhill | H04L 9/0863 |
| 2025/0080322 A1 * | 3/2025 | Kambayashi | H04L 9/3213 |

OTHER PUBLICATIONS

Computational Image Encryption Techniques: A Comprehensive Review https://www.hindawi.com/journals/mpe/2021/5012496/ Mathematical Problems in Engineering, vol. 2021, Article IDS 5012496, 17 pages, https://doi.org/10.1155/2021/5012496.
Ferguson, N., Schneier, B., & Kohno, T. (2011). Cryptography Engineering (1st ed.). Wiley. Retrieved from https://www.perlego.com/book/1009351/cryptography-engineering-design-principles-and-practical-applications-pdf (Original work published 2011).

* cited by examiner

*Primary Examiner* — Harunur Rashid
(74) *Attorney, Agent, or Firm* — Foley & Lardner LLP

(57) ABSTRACT
A system and method of securing data, such as images, may include receiving, by an edge server operating on a local area network (LAN) and communicatively coupled to a cloud-based server, encrypted data captured and/or generated by a first device operating on the LAN. The edge server may store the encrypted data in a data repository, the encrypted data being stored as encrypted data. Responsive to a second device operating on the LAN requesting the encrypted data, the edge server may communicate the encrypted data to the second device executing a customer application configured to decrypt and display the encrypted data.

18 Claims, 4 Drawing Sheets

400

PRIVACY SOLUTION FOR IMAGES LOCALLY GENERATED AND STORED IN EDGE SERVERS

BACKGROUND

Information conveyed by digital images can be very sensitive and confidential in many applications, such as in industrial and retail fields. Typical image collection and storage processes used by imaging systems within a local area network (LAN), such as in a manufacturing or logistics facility, are to capture an image and communicate the image to an edge server for encryption and storage thereby. Encryption, which is a procedure to convert plain images to encrypted images by means of one or more secret keys, is often used to hide or otherwise protect images and other information. Many image encryption approaches exist based on different concepts and key performance metrics, such as confusion degree, correlation with the input image, computational complexity, and resistance to cryptanalysis. Edge servers are typically servers that operate on a LAN, but are also in communication with a wide area network (WAN), such as the Internet, such that there is an increased risk of unauthorized access to the server and content stored thereon. As such, there is the need to protect digital images (and other confidential information) that is created and stored on a LAN owned by an operator of devices that create and/or capture data, such as digital images, from unauthorized access and/or modification.

BRIEF SUMMARY

To overcome the problem of data, such as images and other confidential information, from being accessed by unauthorized actors via edge servers, especially when the images and other confidential information is communicated to an edge server of a local area network (LAN) without being encrypted and then encrypted and stored by edge servers of local networks, the principles provided herein provides for privacy of data, such as digital images and/or other confidential information, generated or captured by a vision system or scan-point, such as with WebSentinel Plus (WS+), and stored on an edge server on the LAN. WebSentinel Plus is software made by Datalogic for local control of the performances of vision systems reading barcodes in transportation and logistics applications (e.g. sortation of parcels traveling on a conveyor belt). It should be understood that other software systems that perform the same or similar functions may be utilized. The edge server may be an industrial personal computer or other edge-level device. To provide for privacy of the data, especially in a trustless environment in which an edge server operates by being in communication with a public network (e.g., the Internet), each device (e.g., vision system or scan-point) may be configured to exchange encryption keys and private signatures as part of an encryption process to generate encrypted data by the imaging devices and communicate the encrypted data to an edge server on the LAN for storage thereby. The edge server may store the encrypted data (e.g., encrypted images) in a data repository without the ability to access the plain data due to the data being received from the device(s). To enable a customer application to access the encrypted data, the customer app, imaging device(s), and edge server (s) may share a private symmetric encryption key generated by the customer application that is then used to encrypt the data. As a result, the customer app is able to decrypt the data using the private symmetric encryption key. Private signatures may be utilized to verify the identities of various devices that communicate the encrypted data.

One embodiment of a method of securing data, such as images, may include receiving, by an edge server operating on a local area networks (LAN) and communicatively coupled to a cloud-based server, encrypted data captured and/or generated by a first device operating on the LAN. The edge server may store the encrypted data in a data repository, the encrypted data being stored as encrypted data. Responsive to a second device operating on the LAN requesting the encrypted data, the edge server may communicate the encrypted data to the second device executing a customer application configured to decrypt and display the encrypted data.

One embodiment of a system for securing data, such as images, may include an edge server operating on a local area network (LAN) and communicatively coupled to a cloud-based server. The edge server may include at least one processor and storage device configured to store encrypted data. The processor(s) may be configured to execute software instructions that, when executed, cause the processor (s) to (i) receive encrypted data captured and/or generated by a first device operating on the LAN, (ii) store the encrypted data in a data repository being stored by the storage device, the encrypted data being stored in an encrypted data format, and (iii) communicate the encrypted data to the second device executing a customer application configured to decrypt and display the encrypted data in response to receiving a request for the encrypted data from a second device operating on the LAN.

BRIEF DESCRIPTION OF THE FIGURES

Illustrative embodiments of the present invention are described in detail below with reference to the attached drawing figures, which are incorporated by reference herein and wherein.

DETAILED DESCRIPTION

Companies, such as manufacturing and logistics companies, often utilize "reading scan-points" or imaging devices that operate on a local area network on which a local (edge) PC or server operates. The edge server, which may include any computing system having server functionality, may execute an information or data collection system and monitoring system for managing data, such as images captured by imaging devices. Captured data by the devices on a local area network (LAN) may be saved on a storage device of the edge server. Conventional LAN and imaging device configurations transfer plain or non-encrypted images (e.g., unencrypted jpg images) to the edge server from devices to the edge server using secure file transfer protocol (SFTP), which provides a secure channel with certificate and private/public keys). Thereafter, the edge server saves the plain image to a data repository such that the plain images may be encrypted by the edge server. Although SFTP is generally considered a sufficient protection for plain images while the images are being transmitted from an imaging device to the edge server, the images that are stored in a non-volatile media are to be encrypted. Prior to the encryption, however, malware or a bad actor (e.g., operator of the edge server) may have access to the plain images. Companies in the manufacturing and logistics fields, amongst many others, recognize the need to maintain privacy of such images that often contain sensitive information.

As is further presented herein, data, such as images, may be encrypted by device(s) that capture and/or generate the data. The encrypted data may be stored as privacy-proof data at an edge level, such as by an edge server, on a LAN. The data are not transferred in plain format (e.g., raw image) on the local network so as to avoid on-air privacy issues (e.g., packet sniffing). Moreover, the encrypted data may not be transferred between an edge server and cloud server or other device to avoid high time latencies of a service and additional costs in terms of network bandwidth consumption and cloud resources, both for storage and processing services. Information used for secrecy purposes, such as encrypted data, symmetric keys and access codes or private keys, may be combined and exchanged between cloud/edge level, device(s), and client or customer application(s) while using a secure channel (e.g., HTTPS) at the very beginning of a process for ensuring trust amongst device(s), edge server(s), and customer application(s) being executed on device(s).

Figure 1:
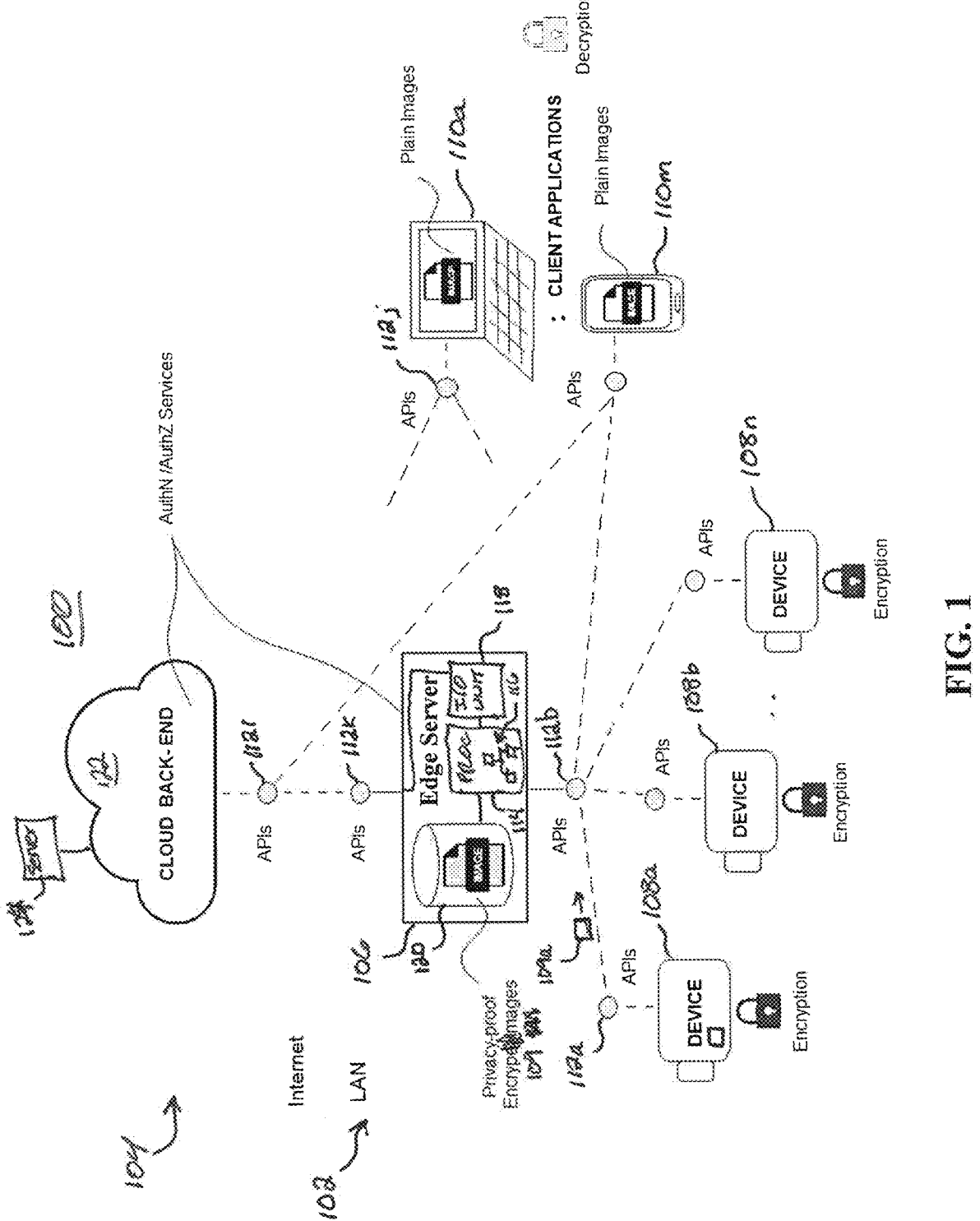
FIG. 1 is an illustration of an illustrative network of the principles for providing a privacy solution for securing data generated by device(s) on a local area and stored by an edge server on the local area network (LAN)

With regard to FIG. 1, an illustration of an illustrative environment 100 in which a privacy solution for protecting data, such as images, is shown. The environment 100 may include a local area network 102 and wide area network (WAN) 104 (e.g., the Internet) in communication via an edge server 106 that supports devices 108a-108n (collectively 108) operating on the LAN 102. The devices 108 are configured to generate and/or collect data, such as images, encrypt the data, and communicate the encrypted data for storage by the edge server 106. Each of the devices 108 may include one or more processors that are configured to collect and/or generate plain data, such as images, and encrypt the data to form encrypted data 109a-109n (collectively 109) prior to communicating the encrypted data 109 to the edge server 106 for storage thereby (e.g., storage of the encrypted data 109 on or off the edge server 106). As further shown, electronic devices, which may also be operating on the LAN 102, may be configured to execute client applications 110a-110m (collectively 110). The client applications are meant to provide users access to the encrypted data 109.

As shown, each of the edge server 106, devices 108, and electronic devices 110 may be in communication with one another using application programming interfaces (APIs) 112a-112l (collectively 112). The APIs 112 may be configured to enable encryption keys and digital signatures to be communicated amongst one another (see FIG. 2, for example). The edge server 106 may include one or more processors 114 that execute software 116 for handling the encryption keys and digital signatures and for managing encrypted data (e.g., encrypted images) collected and/or generated by the devices 108 via an input/output (I/O) unit 118. The I/O unit 118 may be configured to communicate over wired and/or wireless communications channels utilizing any communications protocols, as understood in the art. The edge server 106 may include a storage device 120, such as a hard drive, that is configured to store the encrypted data (e.g., images) 109 in a data repository (e.g., database stored on the storage device 120). The edge server 106 may include an API 112k that communicates with the network 104 that may include a cloud back-end 122 with a cloud server 124 operating thereon. As understood, the edge server 106 may be accessible to the cloud-based server 124 and any other device configured to communicate via the APIs 112k and 112l. The cloud back-end 122 and/or cloud-based server 124 may be configured to support authentication and authorization (AuthN/AuthZ) services with the edge server 106.

Moreover, the process depicted in FIG. 1 provides a hybrid system with the edge server 106 and the cloud back-end 122 with both sides based on API Rest technology for communications on the WAN 104. The client applications 110 may communicate through the APIs 112 with the cloud back-end 122, if any, or at least with the edge server 106 for authentication and authorization purposes. The client applications 110, which may be configured to decrypt the stored encrypted data 109, do not have to communicate directly with the APIs 112 of the devices 108, but rather may access the encrypted data 109 from the edge server 106 to decrypt the encrypted data 109 within the client application to retrieve plain or unencrypted data (e.g., plain images).

Figure 2:
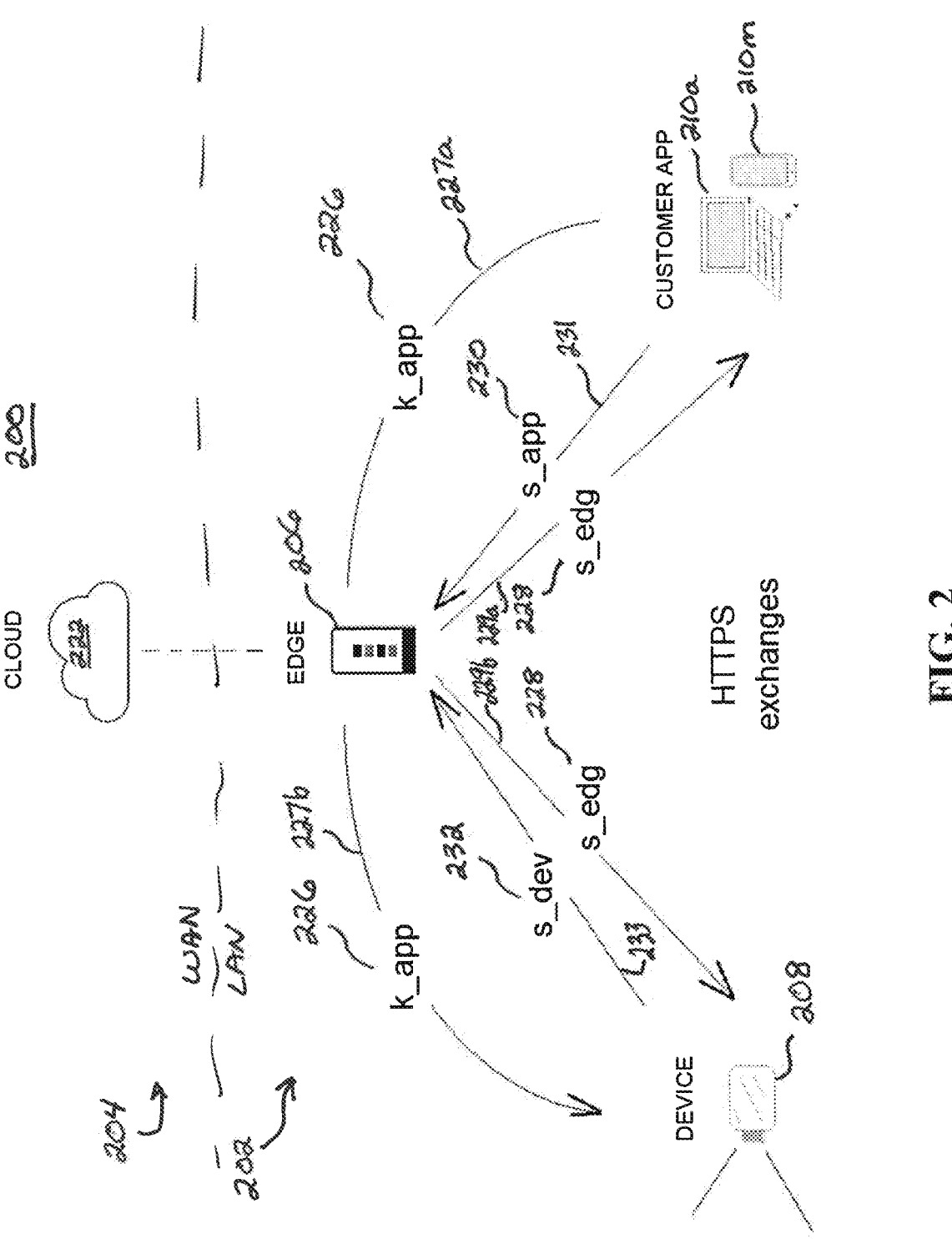
FIG. 2 is an illustration of devices on a local area network (LAN) and edge server with access to a wide area network (WAN), such as the Internet, that communicate keys and private signatures so as to provide for protecting images stored by the edge server while making encrypted images stored thereby available to a customer application.

With regard to FIG. 2, an illustration of a network environment 200 in which a local area network (LAN) 202 and a wide area network (WAN) 204, such as the Internet, with an edge server 206 that supports privacy of data stored thereby is shown. The LAN 202 includes the edge server 206, a device 208 (e.g., imaging device), and electronic device(s) (e.g., PC, mobile device, etc.) that are executing a customer application 210 to access encrypted data (e.g., images) stored by the edge server 206, as described in FIG. 1. Privacy amongst the edge server 206, device 208, and customer application 210 may be established by exchanging encryption keys and private digital signatures by communicating keys and private signatures with one another so as to provide for protecting collected and/or produced confidential data (e.g., images) stored by the edge server 206 while making encrypted images stored by the edge server 206 available to the customer application being executed by the customer application 210.

In particular, privacy by the edge server 206, device 208, and customer application 210 may be established by using a private symmetric encryption key k_app 226 generated or obtained by the customer application 210. The k_app 226 may be communicated to the device 208 from the customer application 210 via the edge server 206 at step 227a, and from the edge server 206 to the device 208 at step 227b. The private symmetric encryption key k_app 226 may be encrypted by using a public asymmetric key (not shown) of the device 208, so the private symmetric encryption key k_app 226 is never made available to the edge server 206 in plain text, thereby preventing the edge server 206 from being able to access encrypted data that is captured and/or generated and encrypted by the device 208 using the private symmetric encryption key k_app 226 of the customer apps 210.

The communications of steps 227a and 227b may be initially performed using a secure channel (e.g., hypertext transfer protocol secure (HTTPS), transport layer security (TLS), or other secure communication protocol). After an initial communication to share the private symmetric encryption channel key k_app 226 and optionally private signatures, a non-secure communication channel may be utilized. If other devices in the LAN 202 are to generate encrypted data, the private symmetric encryption key k_app 226 may also be communicated to the other devices. If multiple customer applications are utilized, each of the customer applications may generate or obtain different private symmetric encryption keys k_app such that each device may produce encrypted data that is limited to be accessed by respective customer applications. The device 208 and customer application 210 may use the private symmetric encryption key k_app 226 to respectively encrypt and decrypt data (e.g., images).

A private signature s_edg 228 may be generated by the edge server 206 and communicated at steps 229a and 229b to both the device 208 and the customer applications 210 in establishing privacy of the data from the device 208. The customer application 210 may use the private signature s_edg 228 to verify a device-edge-app communication chain of the privacy transaction. A private signature s_app 230 may be generated by the customer application 210 and communicated to the edge server 206 at step 231. The private signature s_app 230 may be limited to the edge server 206 (i.e., not communicated to the device 208). The customer application(s) 210 may use the private signature s_edg 228 to verify identity of the edge server 206 that thereafter communicates encrypted data to the customer app 210. A private signature s_dev 232 generated by the device 208 may be communicated to the edge server 206 at step 233 and limited to the edge server 206 (i.e., not communicated to the customer app 210). The edge server 206 may use the private signature s_dev 232 to verify the identity of the device 208 that captures or generates encrypted data that is sent to the edge server 206 thereafter.

In summary, the customer application 210 may contact the edge server 206 to access a privacy service relating to a certain set of devices 208 of interest (e.g., identified based on MAC address or serial number) while optionally providing at the same time credentials (e.g., password or access token) of the customer application 210. The credentials of the customer application 210 may alternatively be provided thereafter. The edge server 206 may validate the identity and permissions of the customer application 210 by contacting specific services in the cloud 222, if not locally hosted, such as authentication and authorization services. The edge server 206, in response to successful validation of the customer application 210, may execute a dedicated asymmetric key management service and initiate an information exchange to establish privacy amongst the device 208, edge server 206, and customer application 210, as previously described. Once privacy amongst the device 208, edge server 206, and customer application 210 has been established, the secure channel (HTTPS) is no longer needed and a non-secure communication channel (e.g., HTTP) is sufficient. Thereafter, encryption of data, storage of encrypted data, and decryption operations of the encrypted data may be utilized for secure operations, as provided in FIG. 3, where Send( ), Req, and Resp( ) messages may be exchanged over time.

Figure 3:
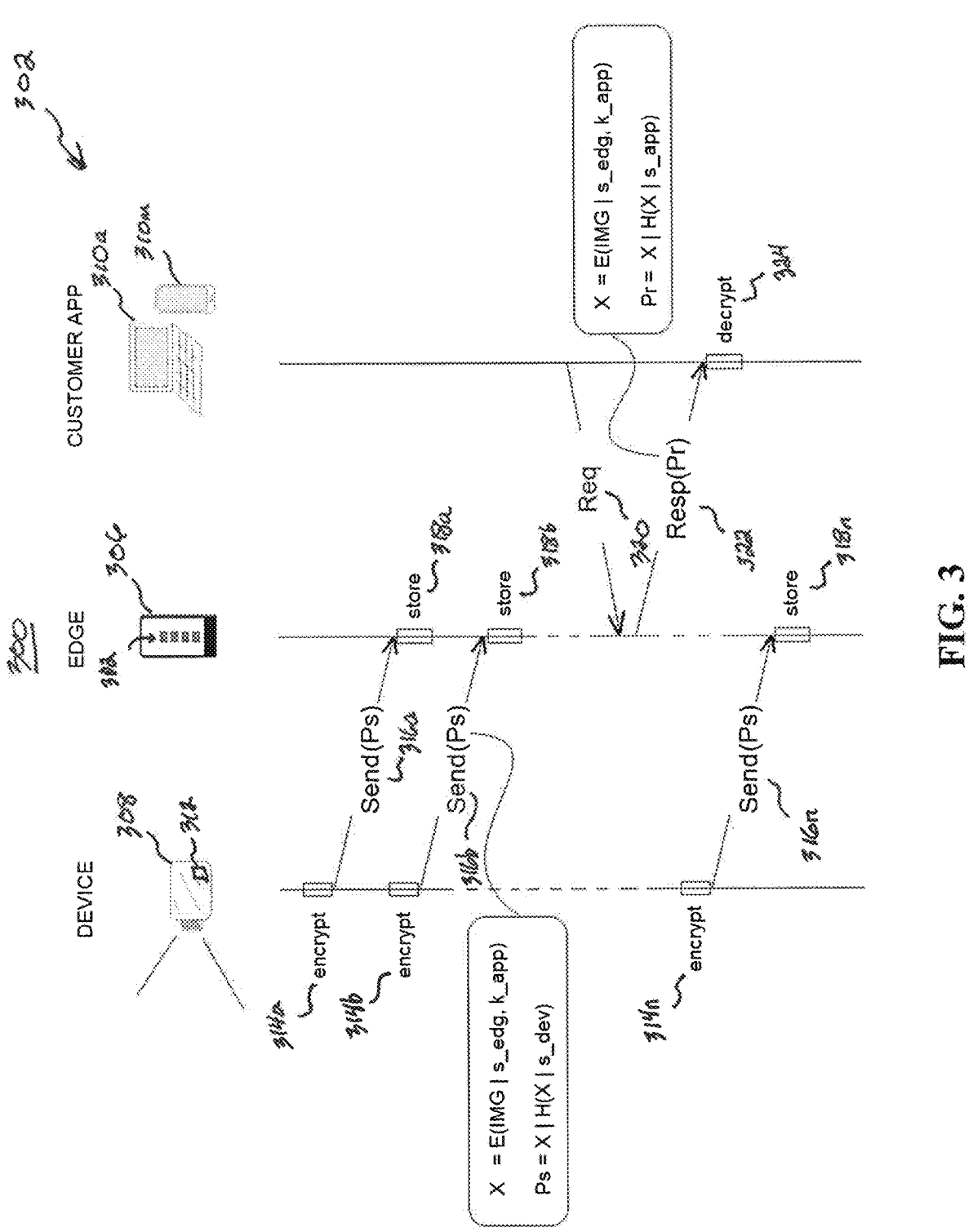
FIG. 3 is an illustration of an illustrative sequence diagram showing communications amongst devices on the LAN of FIG. 2 that ensure that images collected or generated by a device are encrypted, stored by the edge server, and are accessible and decryptable by a customer application.

With regard to FIG. 3, an illustration of an illustrative sequence diagram 300 showing communications on a LAN 302 including an edge server 306, device 308, and electronic devices executing a customer app 310a-310m (collectively 310) that ensure data 312 collected or generated by the device 308 are maintained private from the device 308 to the customer app 310 is shown. The data 312 captured and/or generated by the device 308 may be encrypted by the device 308 at steps 314a-314n (collectively 314). The data 312 may be images, sequence of images (e.g., video), or audio, and/or other data that is captured and/or generated by the device 308. The encryption steps 314 may ensure that the data 312 communicated from the device 308 to the edge server 306 and customer app 310 is limited to be communicated as encrypted data so as to be secure in the event that any other device or application that has not been property authenticated and authorized is unable to access the plain data 312 (e.g., actual image).

At step 316a, a payload may be sent via a Send(Ps) message. The payload may be encrypted data 312 formed at step 314a. At step 318a, the edge server 306 may store the payload Ps, which is a sent payload. Because the data 312 is encrypted, the data 312 is stored as encrypted data in a data repository on the storage unit 120 (FIG. 1) or in another storage unit remote from the edge server 106. Over time, additional collected data 312 that is encrypted by the device 308 may be encrypted at steps 314b-314n and communicated using send(Ps) messages 316b-316n to the edge server 306 for storage thereby at step 318b-318n either on a storage device of the edge server 306 or elsewhere. The customer application 310, may send a Request message at step 320 to the edge server 306 to request the encrypted data 312 (e.g., data encrypted at step 314b) that is communicated in a Resp(Pr) message at step 322, where Pr is a received payload of the edge server 306. The customer application 310 may decrypt the received payload Pr at step 324 for display thereby for a user utilizing the customer app 302.

The sent payload Ps may be encrypted using an encryption process as supported by the privacy configuration and communications of FIG. 2.

For example, the following encryption algorithm may describe the payloads Ps and Pr that are communicated between the device 308 to the edge server 306 and from the edge server 306 to the customer application 310 in a trustless environment.

The Sent Payload Ps May be Established by:
$$X = E(IMG|s\_edg, k\_app);$$
$$Ps = X|H(X|s\_dev), \text{ and}$$

The Received Payload Pr May be Established by:
$$X = E(IMG|s\_edg, k\_app);$$
$$Pr = X|H(X|s\_app), \text{ where:}$$

X is ciphertext that is transformed from plain text using an encryption algorithm;

IMG is the plain image with optional metadata;

a|b means "append b to a," (i.e., "concatenation of a with b contents")

E(a,b) means "encryption of payload a using the private key b";

H(a) means "cryptographic hash function of a"; and

Ps and Pr are plain text payloads.

Figure 4:
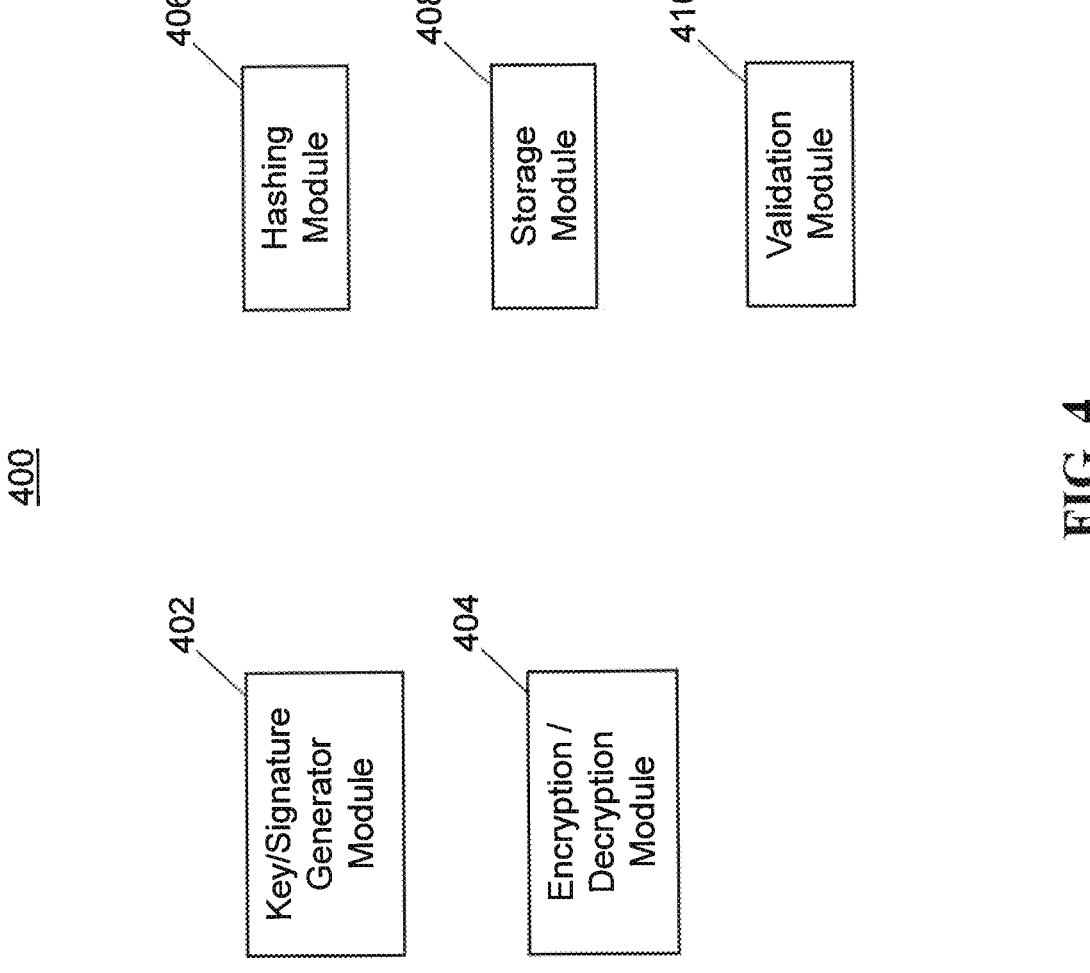
FIG. 4 is a block diagram of illustrative modules configured to encrypt, store, and decrypt images on the LAN of FIGS. 1 and 2 and processes described in FIG. 3.

With regard to FIG. 4, a block diagram of illustrative modules 400 used to be implemented by the various components (e.g., edge server, device(s), and customer application(s)) to provide for privacy of data collected and/or generated by device(s) operating on a LAN in which the various components are operating to provide privacy of the data is shown. The modules 400 may include a key/signature generator module 402, encryption/decryption module 404, hashing module 406, storage module 408, and validation module 410. It should be understood that additional and/or alternative modules may be utilized to support the various components. The modules 400 may be used to generate private information that is initially exchanged among the various components in a confidential manner (HTTPS).

The key/signature generator module 402 may be configured to use pseudo-random-number generators (PRNG) with defined policies for seed renewal and secure storage of seeds. In an embodiment, commercial trusted platform modules/chips may be adopted and utilized by the module 402 such as images. In the event that the validation module 410 determines that a validation fails, the protocol may supply proper error messages prior to discarding a payload Ps or Pr.

TABLE I

| | Payload Validation | |
|---|---|---|
| Payload | Validation Type | Effect |
| Ps | The edge server extracts and locally stores the value X = E(IMG \| s_edg, k_app) and then, knowing the expected s_dev, computes H(X \| s_dev) and checking if the computed value equals the received value. | To validate the identify of the device that generated the encrypted data. |
| Pr | The customer application extracts the value X = E(IMG\|s_edg, k_app), and then knowing the expected s_app, computes H(X\|s_app) and checks if the computed value is equal to the received one to trust the edge server providing the encrypted data. Finally, by using the private k_app, decrypts X and extracts s_edg that is compared with the expected value to trust the whole message transaction from the customer application to the edge server to the device and back to the edge server to the customer application. | To validate the identity of the edge server that provided the encrypted data. | for performing the generation of key(s) and/or signatures. As provided in FIG. 2, the key(s) may include the private symmetric encryption key k_app 226, and the signatures may include the private signature s_edg 228, private signature s_app 230, and private signature s_dev 232. It should be understood that additional and/or alternative keys and private signatures may be utilized in accordance with the principles described herein.

The encryption/decryption module 404 may be configured for symmetric encryption purposes, which is function E(·). In an embodiment, a common software library implementing NIST standard Advanced Encryption Standard (AES) may be adopted by the encryption/decryption module 404 so as to ensure not only security, but also high speed and low random access memory usage for both encryption and decryption of data, such as images.

The hashing module 406 may be utilized for hashing purposes or function H(·). In an embodiment, a common software library implementing Secure Hash Algorithm 3 (SHA-3) may be utilized by the hashing module 406. SHA-3 is a gold-standard by NIST and is utilized for security purposes for encryption processes.

The storage module 408 may be a simple file system or a dedicated database that is maintained by the edge server. As previously described, the images stored by the edge server are encrypted so that enhanced security of the file system or dedicated database may be avoided. As a result of the security process described with regard to FIGS. 2 and 3, the stored encrypted images may be limited to the customer application being able to access and display the encrypted data in a plain format.

The validation module 410 may be utilized to verify each payload received (i.e., payloads Ps is verified by the edge server and payload Pr is verified by the customer application) by using available private information (e.g., private signatures and key(s)) since the privacy process depicted in FIG. 3 is not based on a secure channel (i.e., HTTP protocol). Utilizing the validation module 410 avoids malicious attacks (e.g., TCP hijacking) or simple tampering of data, One embodiment of a method of securing data, such as images, may include receiving, by an edge server operating on a local area network (LAN) and communicatively coupled to a cloud-based server, encrypted data captured and/or generated by a first device operating on the LAN. The edge server may store the encrypted data in a data repository, the encrypted data being stored as encrypted data. Responsive to a second device operating on the LAN requesting the encrypted data, the edge server may communicate the encrypted data to the second device executing a customer application configured to decrypt and display the encrypted data.

The process may further include receiving, by the edge server, a secure communication request from the second device, and, in response to receiving the secure communication request, the edge server may request the secure communication request to the first device to enable a private symmetric encryption key to be communicated from the first device to the second device via the edge server.

The process may further include generating, by the customer application, the private symmetric encryption key by using a public asymmetric encryption key of the first device. The edge server may generate a private edge signature, and communicate the private edge signature to the first and second devices, thereby availing the first device and the customer application of the private edge signature.

In an embodiment, the edge server may receive a first private signature of the first device, and store the private signature of the first device. The process may further include generating, by the first device, the first private signature. The edge server or device may receive a second private signature of the customer application, and store the second private signature of the customer app. The customer application may generate the second private signature.

Receiving the encrypted data may include receiving a plain text source payload (Ps) defined by a ciphertext (X) concatenated with a cryptographic hash function (H) of the ciphertext (X) concatenated with the first private signature (s_dev) of the first device, which may be described by:

Ps=X|H(X|s_dev). The ciphertext (X) may be defined by an encryption of the data (IMG) concatenated with the private edge signature (s_edg) of the edge server using the private symmetric encryption key (k_app) of the customer application, which may be described as: X=E(IMG|s_edg, k_app).

Communicating the encrypted data may include communicating a plain text received payload (Pr) defined by the ciphertext (X) concatenated with a cryptographic hash function (H) of the ciphertext (X) concatenated with the second private signature (s_app) of the customer application, which may be described as: Pr=X|H(X|s_app), where the ciphertext (X) may be defined by an encryption of the data (IMG) concatenated with the private edge signature (s_edg) of the edge server using the private symmetric encryption key (k_app) of the customer application, which may be described by: X=E(IMG|s_edg, k_app).

Storing the encrypted data by the edge server may include storing the encrypted data in a manner in which the edge server is unable to decrypt the encrypted data, and wherein the encrypted data is an encrypted image.

One embodiment of a system for securing data, such as images, may include an edge server operating on a local area network (LAN) and communicatively coupled to a cloud-based server. The edge server may include at least one processor and storage device configured to store encrypted data. The processor(s) may be configured to execute software instructions that, when executed, cause the processor(s) to (i) receive encrypted data captured and/or generated by a first device operating on the LAN, (ii) store the encrypted data in a data repository being stored by the storage device, the encrypted data being stored in an encrypted data format, and (iii) communicate the encrypted data to the second device executing a customer application configured to decrypt and display the encrypted data in response to receiving a request for the encrypted data from a second device operating on the LAN.

The processor(s) may further be configured to receive a secure communication request from the second device, and request, in response to receiving the secure communication request, the secure communication request to the first device to enable a private symmetric encryption key to be communicated from the first device to the second device.

The processor(s) may further be configured to generate a private edge signature, and communicate the private edge signature to the first and second devices, thereby availing the first device and the customer application of the private edge signature.

The processor(s) may further be configured to receive a first private signature of the first device, and store the private signature of the first device.

The first device may be configured to generate the first private signature.

The processor(s) may further be configured to receive a second private signature of the customer application, and store the second private signature of the customer app.

The customer application may further be configured to generate the second private signature.

The processor(s), in receiving the encrypted data, may further be configured to receive a plain text source payload (Ps) defined by a ciphertext (X) concatenated with a cryptographic hash function (H) of the ciphertext (X) concatenated with the first private signature (s_dev) of the first device, which may be described as: Ps=X|H(X|s_dev), and where the ciphertext (X) may be defined by an encryption of the data (IMG) concatenated with the private edge signature (s_edg) of the edge server using the private symmetric encryption key (k_app) of the customer application, which may be described as: X=E(IMG|s_edg, k_app).

The processor(s), in communicating the encrypted data, may further be configured to communicate a plain text received payload (Pr) defined by the ciphertext (X) concatenated with a cryptographic hash function (H) of the ciphertext (X) concatenated with the second private signature (s_app) of the customer application, which may be described as: Ps=X|H(X|s_app), where the ciphertext (X) is defined by an encryption of the data (IMG) concatenated with the private edge signature (s_edg) of the edge server using the private symmetric encryption key (k_app) of the customer application, which may be described as X=E(IMG|s_edg, k_app).

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operably connected with each other, such as connected through a direct connection or through an indirect connection (e.g., via another structure or component).

The foregoing method descriptions and/or any process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be communicated (e.g., passed, forwarded, and/or transmitted) via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed is:

1. A method of securing data, said method comprising:
receiving, by an edge server operating on a local area network (LAN) and communicatively coupled to a cloud-based server, encrypted data captured and/or generated by a first device operating on the LAN;
storing, by the edge server, the encrypted data in a data repository, the encrypted data being stored as encrypted data; and
responsive to a second device operating on the LAN requesting the encrypted data, communicating, by the edge server, the encrypted data to the second device executing a customer application configured to decrypt and display the encrypted data,
wherein receiving the encrypted data includes:
receiving a plain text source payload (Ps) defined by a ciphertext (X) concatenated with a cryptographic hash function (H) of the ciphertext (X) concatenated with a first private signature (s_dev) of the first device; and
wherein the ciphertext (X) is defined by an encryption of the data (IMG) concatenated with a private edge signature (s_edg) of the edge server using a private symmetric encryption key (k_app) of the customer application.

2. The method according to claim 1, further comprising:
receiving, by the edge server, a secure communication request from the second device; and
in response to receiving the secure communication request, requesting, by the edge server, the secure communication request to the first device to enable the private symmetric encryption key (k_app) to be communicated from the second device to the first device via the edge server.

3. The method according to claim 2, further comprising generating, by the customer application, the private symmetric encryption key (k_app) by using a public asymmetric encryption key of the first device.

4. The method according to claim 2, further comprising:
generating, by the edge server, the private edge signature (s_edg); and
communicating, by the edge server, the private edge signature (s_edg) to the first and second devices, thereby availing the first device and the customer application of the private edge signature (s_edg).

5. The method according to claim 4, further comprising:
receiving, by the edge server, the first private signature (s_dev) of the first device; and
storing, by the edge server, the first private signature (s_dev) of the first device.

6. The method according to claim 5, further comprising generating, by the first device, the first private signature (s_dev).

7. The method according to claim 5, further comprising:
receiving, by the edge server, a second private signature of the customer application; and
storing, by the edge server, the second private signature of the customer application.

8. The method according to claim 7, further comprising generating, by the customer application, the second private signature.

9. The method according to claim 1, wherein communicating the encrypted data includes:

communicating a plain text received payload (Pr) defined by the ciphertext (X) concatenated with a cryptographic hash function (H) of the ciphertext (X) concatenated with the second private signature (s_app) of the customer application; and wherein the ciphertext (X) is defined by an encryption of the data (IMG) concatenated with the private edge signature (s_edg) of the edge server using the private symmetric encryption key (k_app) of the customer application.

10. The method according to claim 1, wherein storing the encrypted data by the edge server includes storing the encrypted data in a manner in which the edge server is unable to decrypt the encrypted data, and wherein the encrypted data is an encrypted image.

11. A system for securing data, said system comprising:

an edge server operating on a local area network (LAN) and communicatively coupled to a cloud-based server, the edge server including at least one processor and storage device configured to store encrypted data, the at least one processor configured to execute software instructions that, when executed, cause the at least one processor to:

receive encrypted data captured and/or generated by a first device operating on the LAN;

store the encrypted data in a data repository being stored by the storage device, the encrypted data being stored in an encrypted data format; and responsive to receiving a request for the encrypted data from a second device operating on the LAN, communicate the encrypted data to the second device executing a customer application configured to decrypt and display the encrypted data; and in receiving the encrypted data, the at least one processor is further configured to:

receive a plain text source payload (Ps) defined by a ciphertext (X) concatenated with a cryptographic hash function (H) of the ciphertext (X) concatenated with a first private signature (s_dev) of the first device; and wherein the ciphertext (X) is defined by an encryption of the data (IMG) concatenated with the private edge signature (s_edg) of the edge server using the private symmetric encryption key (k_app) of the customer application.

12. The system according to claim 11, wherein the at least one processor is further configured to:

receive a secure communication request from the second device; and request, in response to receiving the secure communication request, the secure communication request to the first device to enable a private symmetric encryption key to be communicated from the first device to the second device.

13. The system according to claim 12, wherein the at least one processor is further configured to:

generate the private edge signature (s_edg); and communicate the private edge signature (s_edg) to the first and second devices, thereby availing the first device and the customer application of the private edge signature (s_edg).

14. The system according to claim 13, wherein the at least one processor is further configured to:

receive the first private signature (s_dev) of the first device; and store the first private signature (s_dev) of the first device.

15. The system according to claim 14, wherein the first device is configured to generate the first private signature (s_dev).

16. The system according to claim 14, wherein the at least one processor is further configured to:

receive a second private signature of the customer application; and store the second private signature of the customer application.

17. The system according to claim 16, wherein the customer application is configured to generate the second private signature.

18. The system according to claim 11, wherein the at least one processor, in communicating the encrypted data, is further configured to:

communicate a plain text received payload (Pr) defined by the ciphertext (X) concatenated with a cryptographic hash function (H) of the ciphertext (X) concatenated with the second private signature (s_app) of the customer application; and wherein the ciphertext (X) is defined by an encryption of the data (IMG) concatenated with the private edge signature (s_edg) of the edge server using the private symmetric encryption key (k_app) of the customer application.

* * * * *